United States Patent

Hayasaki

[11] Patent Number: 5,268,593
[45] Date of Patent: Dec. 7, 1993

[54] SWITCHING POWER SOURCE CIRCUIT

[75] Inventor: Kiyonobu Hayasaki, Tokyo, Japan

[73] Assignee: NEC Corporation, Tokyo, Japan

[21] Appl. No.: 839,103

[22] Filed: Feb. 20, 1992

[30] Foreign Application Priority Data

Feb. 21, 1991 [JP] Japan ................................. 3-047374

[51] Int. Cl.$^5$ .............................................. G05F 1/00
[52] U.S. Cl. .................................... 307/125; 323/272; 363/71
[58] Field of Search .................. 307/43, 112, 113, 116, 307/115, 125, 126, 130, 131, 139, 140, 85–87; 323/272, 271; 363/71

[56] References Cited

U.S. PATENT DOCUMENTS

| 4,766,364 | 8/1988 | Biamonte et al. | 323/272 |
| 4,877,972 | 10/1989 | Sobhani et al. | 307/43 |
| 5,122,726 | 6/1992 | Elliott et al. | 323/272 |

FOREIGN PATENT DOCUMENTS 3-3018 1/1991 Japan .

OTHER PUBLICATIONS

Japanese Published Unexamined Utility Model Appl. 3-3018, Jan. 14, 1991 (no English translation), figs. 1-3.

Primary Examiner—A. D. Pellinen
Assistant Examiner—Richard T. Elms
Attorney, Agent, or Firm—Laff, Whitesel, Conte & Saret

[57] ABSTRACT

A parallel type switching power source circuit wherein reliable energization is achieved by individual power source switches provided for power source units, without common start-up switch, is provided. The start-up signal input terminals $I_1$ and $I_2$ and the drive stop signal input terminals $R_1$ and $R_2$ of power source units 12, 22 become active when they are connected to the negative side of an input power source 31. The power source unit 12 (or 22) starts only if the start-up signal input terminal $I_1$ (or $I_2$), is active and the drive stop signal input terminal $R_1$ (or $R_2$) is non-active. When the power source switch 16 is turned on at first, $I_1$ becomes active, while $R_1$ retains in active. Then the start-up condition is not satisfied and both of the first and second switching power sources 15 and 25 do not start. When the power source switch 26 is turned on next, $I_2$ becomes active and both of $R_1$ and $R_2$ become non-active. This causes a start-up condition to be arranged, and then the switching power sources 15 and 25 start simultaneously.

3 Claims, 1 Drawing Sheet

SWITCHING POWER SOURCE CIRCUIT

FIELD OF THE INVENTION

This invention relates to switching power sources, especially a switching power source circuit using switching power source units arranged in parallel to a load.

BACKGROUND OF THE INVENTION

Prior Art

For driving various apparatuses, a plurality of power sources such as card type are connected in parallel. Such a case is usually divided into the following two cases. One is the case of using a plurality of card type power sources to gain simply necessary power for driving the apparatus, and in this case it is desirable to switch all power sources on and off simultaneously. Another is the case of providing not only the necessary number of card type power sources to gain necessary power but also a preparatory power source. This is the so-called (N+1) redundancy configuration which enables a rapid back up even in case that either of the working powers has a trouble. In this case it is desirable to make only a part of sources off.

FIG. 2 illustrates a conventional switching power source circuit composed by using card type switching power sources in parallel. Two card type switching power source circuits 11 and 12 are provided in this circuit.

The switching power source comprises separate switching power source units 12 and 22 which have respective first input terminals $A_1$ and $A_2$ connected in parallel to the positive side of an input power source 31, and respective second input terminals $B_1$ and $B_2$ connected in parallel to the negative side of the input power source 31. The negative side of the input power source 31 is branched into two terminals through a common start-up switch 32 provided outside, and the terminals are respectively connected to the start-up signal input terminals $I_1$ and $I_2$ of the first and the second switching power source units 12 and 22. The common start-up switch 32 has a so-called make contact which is closed when the actuator is turned on.

Further, the negative side of the input power source 31 is connected to the drive stop signal input terminals $R_1$ and $R_2$ of the switching power source units 12 and 22 through individual power source switches 13 and 23 provided in the switching power source 12 and 22 respectively the power source switch 13 and 23 have so-called break contacts which becomes open when its actuator is turned on.

Furthermore, the output sides of the switching power source units 12 and 22 are connected in parallel to a common load 33.

Both of the start-up signal input terminal $I_1$ and the drive stop signal input terminal $R_1$ of the first switching power source unit 12 become active when they are connected to the negative side of the input terminal 31. And only if the start-up signal input terminal $I_1$ is active and the drive stop signal input terminal $R_1$ is non-active, the switching power source unit 12 starts. In other words, the switching power source 12 starts and operates when the the negative side of the input power source 31 is connected to the start-up signal input terminal $I_1$ and the drive stop signal input terminal $R_1$ is open. Except for this combination, it does not start or it stops output. The second switching power source 22 is of course configured likewise.

Next, the operation of the above-mentioned configuration of the conventional switching power source circuit is explained.

As both of the individual power source switches 13 and 23 are off before the power source starts, these contacts are closed as FIG. 2 shows. Both of the drive stop signal input terminals $R_1$ and $R_2$ are active. As the common start-up switch 32 is also off before the power source starts, its contact is open. Both of the start-up signal input terminals $I_1$ and $I_2$ are then non-active.

For example, when the individual power source switch 13 of the first switching power source is turned on in this condition, its contact becomes open. Therefore, the drive stop signal input terminal $R_1$ becomes non-active. Similarly, when the individual power switch 23 in the second switching power source 21 is turned on, its contact also becomes open. Therefore the drive stop signal input terminal $R_2$ becomes non-active. Then, when the common switch 32 is turned on, its contact becomes closed, and the start-up signal input terminal $I_1$ and $I_2$ become active. By this operation, these two switching power sources are brought into a start-up condition and start simultaneously.

However suppose, for example, a case where the common start-up switch 32 is turned on after the individual power source switch 13 in the first switching power source 11 was turned on, while the individual power switch 23 in the second switching power source switch 21 is kept off. In this case the first switching power source 11 meets the start-up condition while the second switching power source 21 does not meet this condition. Only the first switching power source starts.

As described above, a part of the switching power sources of the conventional parallel configuration may not be energized for the reason of some mistakes on the procedure of the start-up operation. In this case, the system's fault may occur, because the necessary power is not delivered to the load. Further, in the case that the power lack detecting mechanism is added to the power source, some problems such as an alarm's output occur. Anyhow, in this case, it must be determined whether it comes from some essential malfunctions of the system or a simple mistake. When it is determined that the fault comes from a mistake, it is necessary to repeat the start operation.

Thus, the conventional switching power source has defects in that it needs a common start-up switch as well as individual power source switches for the switching power sources and in that it lacks operability and reliability.

There is the Japanese Published Unexamined Utility Model Application H3-3018 as prior art relating to this invention. In this prior art wherein an AND signal of individual start-up signals of a plurality of power sources is generated in each power source, all the power sources are turned on simultaneously when all the individual start-up signals are arranged. However, the number of terminals increases in this configuration, because it is needed to supply the individual start-up signals of each power source to all the other power sources. Also, when the number of the power sources connected in parallel increases, large scale circuits are needed because the number of the inputs of the AND circuits increases.

SUMMARY OF THE INVENTION

The object of this invention is to provide a switching power source circuit which can be started only by an operation of an individual power source switch in each switching power source and further depress the increase in the number of the terminals of control circuit components.

According to the first aspect of this invention, a switching power source circuit is provided which comprises:

(1) a plurality of switching power source units each having input sides connected in parallel to an input power source for receiving power supply, and actuated only under an AND condition of the input of a start-up signal to all start-up signal input terminals thereof and the stoppage of a drive stop signal to all drive stop signal input terminals thereof;

(2) a common signal supply source for supplying the start-up signal and the drive stop signal to the switching power source units in a common logic level;

(3) individual power source switches each provided for the switching power source units for switching selectively and alternatively between the supply of the start-up signal to the start-up signal input terminals of the corresponding switching power source units from the common signal supply source and the supply of the drive stop signal to the drive stop signal input terminals of the corresponding switching power source from the common signal supply source; and, (4) a connecting line for mutually connecting the drive stop signal input terminals of the switching power source units.

In the first aspect of this invention, a circuit configuration is then achieved wherein each switching power source unit is not brought into an operating condition and is not driven before all the individual power switches are switched to supply the start-up signal to the start-up signal input terminals, by providing the individual power source switches for the switching power source units constituting the switching power source circuit and connecting the drive stop signal input terminals of the switching power source units each other. In this configuration, switching only one of the individual power source switches to supply the drive stop signal causes, all the switching power source units to stop simultaneously.

According to the second aspect of this invention, a switching power source circuit is provided which comprises:

(1) a plurality of switching power source units each having input sides connected in parallel to an input power source for receiving power supply, and actuated only under an AND condition of the input of a start-up signal to all start-up signal input terminals thereof and the stoppage of a drive stop signal to all drive stop signal input terminals thereof; and, (2) individual power source switches each provided for the switching power source units, the common contacts of which are connected to the negative side of the input power source, the first switching contact of which are connected to the start-up signal input terminals of the corresponding switching power sources, and the second switching contacts of which are connected to the drive stop signal input terminals of all the switching power sources.

In the second aspect of this invention, a circuit configuration is then achieved wherein each switching power source unit is not brought into an operating condition and is not driven before all the individual power source switches are switched to the first contact, by connecting the drive stop signal input terminals of all the switching power source units each other and switching between the drive signal and the drive stop signal supplied from the negative side of the input power source by the individual power source switches. Also in this configuration, switching only one of the individual power source switches to the second switching contact causes all the switching power source units to stop simultaneously.

According to the third aspect of this invention, a switching power source circuit is provided which comprises:

(1) a plurality of switching power source units each having input sides connected in parallel to an input power source for receiving power supply, and actuated only under an AND condition of the input of a start-up signal to all start-up signal input terminals thereof and the stoppage of a drive stop signal to all drive stop signal input terminals thereof; and, (2) individual power source switches each provided for the switching power source units, the common contacts of which are connected to the negative side of the input power source, the first switching contact of which are connected to the start-up signal input terminals of the corresponding switching power sources, and the second switching contacts of which are connected to the drive stop signal input terminals of all the switching power sources;

(3) output detecting relays each provided between output terminals of the switching power source units; and, (4) break type relay contacts each provided between the second switching contact of the corresponding individual power source switches and the drive stop signal input terminals of the corresponding switching power source units and becoming open when the corresponding output detecting relays detect the output of the power source units.

In the third aspect of this invention, a circuit configuration is then achieved wherein only a switching power source unit, the individual power source switch of which is switched to the second switching contact is stopped, by providing the output detecting relays between the output terminals of the switching power source units, and the break type relay contacts between the second switching contacts of the individual power source switches and the drive stop signal input terminals of the corresponding switching power source unit, which become open responding to the operation of the corresponding output detecting relays, as well as the circuit configuration of the second aspect of the invention.

EXPLANATION ON REFERENCE NUMBERS AND SYMBOLS

Figure 1:
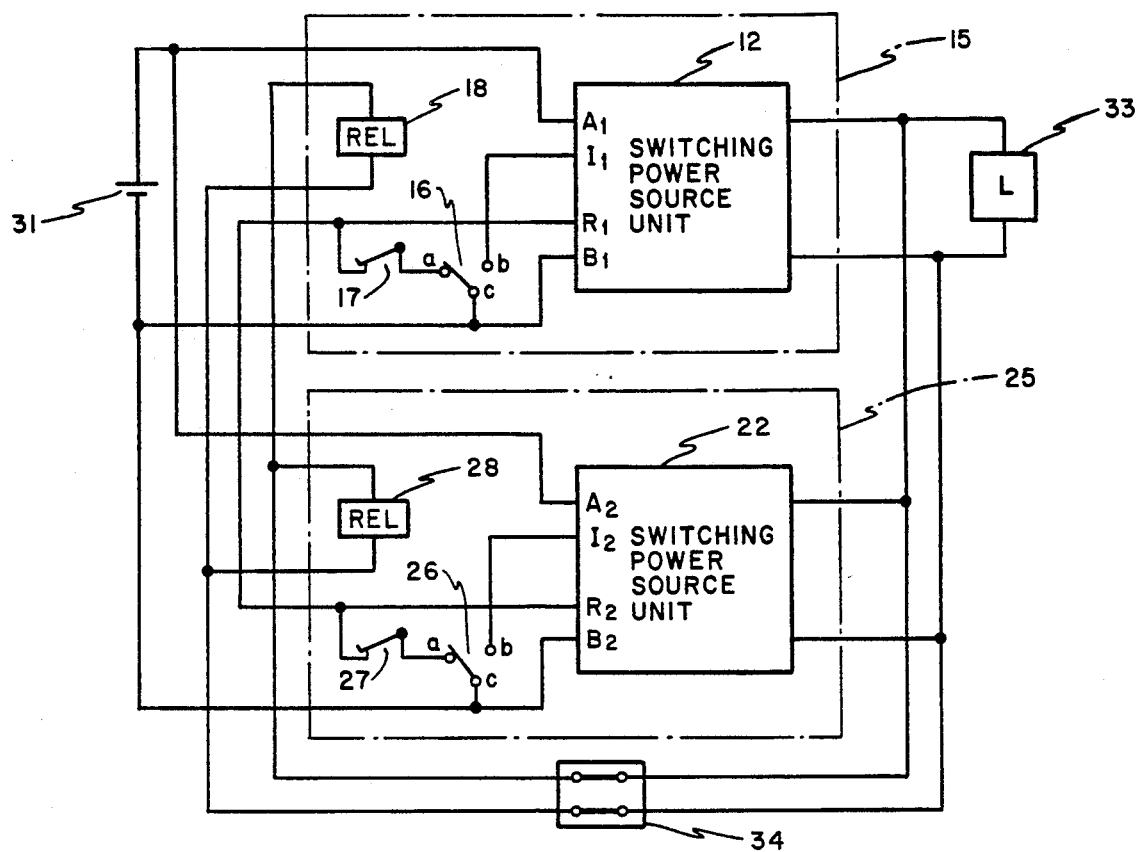
FIG. 1 is a circuit diagram of a switching power source embodying the invention.

12: a first switching power source unit
15: a first switching power source
22: a second switching power source unit
25: a second switching power source 16, 26: a power source switches
17, 27: a relay contacts
18, 28: a output detecting relays
31: a input power source
33: a load
$I_1, I_2$: start-up signal input terminals
$R_1, R_2$: drive stop signal input terminals

DESCRIPTION OF THE EMBODIMENT OF THE INVENTION

The embodiment of the invention is explained as follows.

Figure 2:
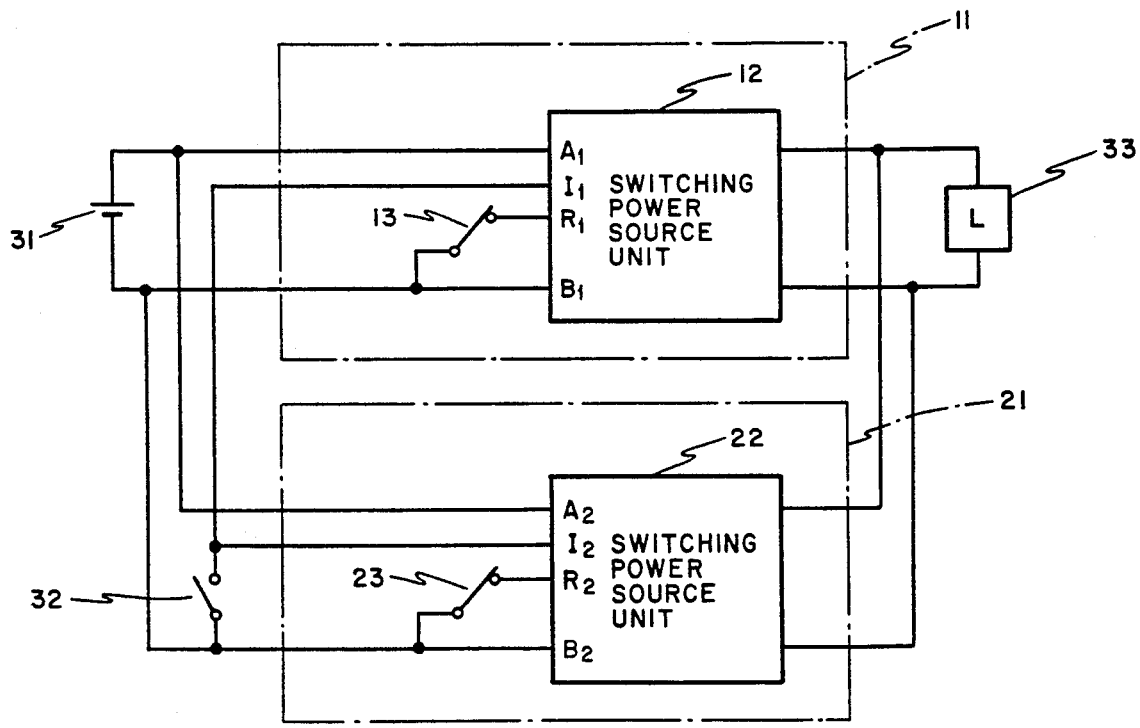
FIG. 2 is a circuit diagram of a conventional switching power source.

FIG. 1 illustrates an switching power circuit embodying the invention. In this figure, the same parts as in the prior art configuration (FIG. 2) are indicated with the corresponding reference numbers or symbols, and their explanations are omitted when redundant.

In this circuit, the first and the second card type switching power sources 15 and 25 are provided, which have switching power units 12 and 22 respectively. The input terminals $A_1$ and $A_2$ of the switching power units 12 and 22 are connected in parallel to the positive side of an input power source 31 and other input terminals $B_1$ and $B_2$ are connected in parallel to the negative side of the input power source 31. The negative side of the input power source 31 is connected to the common contacts c of power source switches 16 and 26 provided in the card type switching power source 12 and 22.

The contact b of the power source switch 16 is connected to the start-up signal input terminal $I_1$ of the switching power source 12, and the contact a thereof is connected to the drive stop signal input terminal $R_1$ through a relay contact 17 which is of a break contact type. Similarly, the contact b of the power source switch 26 is connected to the start-up signal input terminal $I_2$ of the switching power source 22, and the contact a is connected to the drive stop signal input terminal $R_2$ through the relay contact 27 which is also of a break contact type. In these power source switches 16 and 26, the common contact c and the contacts a are connected to each other in the condition of power off.

The drive stop signal input terminal $R_1$ of the first switching power source unit 12 and the drive stop signal input terminal $R_2$ of the second switching power source unit 22 are connected to each other. The outputs of the switching power source units 12 and 22 are connected in parallel to a common load 33, and output detecting relays 18 and 28 are connected in parallel across the outputs through a circuit terminal box 34. These output detecting relays 18 and 28 are energized to make the relay contacts 17 and 27 open in the first and the second switching power sources 15 and 25.

Similarly to the conventional configuration, the start-up signal input terminals $I_1, I_2$ and the drive stop signal input terminals $R_1, R_2$ are arranged to be active when they are connected to the negative side of the input power source 31.

The operation of the parallel switching power circuit as described above is explained as follows.

The operation in the case of closing terminals of the circuit terminal box 34

At first, the operation in the case of closing the terminals of the circuit switching terminal box 34 is explained. When the power source switch 16 in the first switching power source 15 is turned on in the condition that all power sources are off as shown in FIG. 1, its common contact c is connected to the contact b and the negative side of the input power source 31 is then connected to the start-up signal input terminal $I_1$ of the switching power source unit 12. Accordingly, the start-up signal input terminal $I_1$ becomes active. At this time, the drive stop signal input terminal $R_1$ is connected to the negative side of the input power source 31 through the relay contact 27 in the second switching power source 25 and the power switch 26, and is still active, and then the start-up condition is not met. Therefore, both of the first and the second switching power sources 15 and 25 do not start.

Next, when the power source switch 26 in the second switching power source 25 is turned on, the common contact c is connected to the contact b and the negative side of the input power source 31 is connected to the start-up signal input terminal $I_2$ of the switching power source unit 22.

This operation causes the start-up signal input terminal $I_2$ to be active. At this time, since both of the common contacts of the power source switches 16 and 26 are in the side of the contact c the connection between the drive stop signal input terminal $R_2$ and the negative side of the input power source 31 is cut, and then the drive stop signal input terminals $R_1$ and $R_2$ are made open, or non-active. At a result, the start-up condition is arranged and the first and the second switching power sources 15 and 25 are actuated and start to output simultaneously. At this time, the output detecting relays 18 and 28 in the first and second switching power sources 15 and 25 detect an output state and make the relay contacts 17 and 27 open.

In the case of reversing the procedure of switching the power source switches 16 and 26, also the same operation is performed. In any case, all the power sources start simultaneously when all power source switches in the switching power source units have been turned on.

Supposing the power source outputting as described above, when the power source switch 16 in the first switching power source 15 for example is turned off, the common contact c is connected to the contact a, and the start-up signal input terminal $I_1$ is disconnected from the negative side of the input power source 31 and then becomes non-active. This prevents the start-up condition of the switching power source unit 12 from being met, and the first switching power source 15 stops.

And yet, as the second switching power source 25 retains the state of outputting, the relay contacts 17 and 27 are kept open and the drive stop signal input terminal $R_1$ is still in non-active. Therefore, the drive stop signal input terminal $R_2$ of the second switching power source 25 is also in non-active. Therefore, the second switching power source 25 still meets the start condition, so its output does not stop.

Here, suppose that the power source switch 26 in the second switching power source 25 is turned off. Then the common contact c is connected to the contact a, and the start-up signal input terminal $I_2$ is disconnected from the negative side of the input power source 31 and becomes non-active. As a result, the second switching power source 25 is also brought out of the start-up condition and stop outputting.

In brief, in the case where the terminals of the circuit terminal box 34 are closed, only a power source unit the power source switch of which has been off stops outputting and the other units continue to output by means of the output detecting relays 18 and 28. For example, this function is effective for using parallel switching power source units as an (n+1) redundancy configuration. If any working power source come at fault, it is easy to replace only the power source unit at fault without stopping the system, and enable the rapid and reliable back up.

The operation in the case of not closing terminals of the circuit terminal box 34

Next, the operation in the case of not closing the terminals of the circuit terminal box 34 is explained. In this case, as the output detecting relays 18 and 28 do not work, the relay contacts 17 and 27 are always closed, and the operation during power on is similar to the above. Here, therefore, to shorten an explanation, only the case of power source off is explained.

When the power source switch 16 in the first switching power source 15 for example is turned off, at the time that the first and the second switching power sources 15 and 25 are in operation, the common contact c is then connected to the contact a, and the start-up signal input terminal $I_1$ is disconnected from the negative side of the input power source 31 and becomes non-active. This brings the switching power source unit 12 out of the start-up condition and the first switching power source 15 stops.

At this time, the drive stop signal input terminal $R_2$ of the second switching power source 25 is connected to the negative side of the input power source 31 through the power source switch 16 and the relay contact 17 and becomes active. This also brings the second switching power source 25 out of the start-up condition and the output stops.

In brief, in the case where the terminals of the circuit terminal box 34 are not closed, that is, in the case where wiring is arranged directly to connect the contacts a of the power source switches 16 and 26, all the power source units stop the output simultaneously even where the power source switch in any power source units is turned off.

With regard to the above embodiment, the switching power source circuit comprising two switching power source units connected in parallel is explained. However, the same operation is performed even in the case of comprising 3 and more switching power source units connected in parallel.

In summary, according to the first and second aspects of the invention, the individual power source switches are provided for the switching power source to switch between the supply of the start-up signals and the supply of the drive stop signals, and further the drive stop signal input terminals of the switching power source are connected to each other, and accordingly only if all the individual power source switches are switched for the supply of the start-up signals to the start-up signal input terminals, the operational condition of the switching power source units are satisfied and the power source units are actuated. Therefore, a common start-up switch which conventionally required can be obviated, and accidents such as failure in actuation of some switching power source units due to improper operations can be avoided, and the advantageously rapid and reliable power on operation can be achieved.

In addition, at the time of the power source off, it is effective on maneuverability, because all the switching power source units can be stopped simultaneously only by switching any individual power source switch for the supply of the drive stop signal.

Further, according to the third aspect of the invention, the output detecting relays are provided between the terminals in the switching power source units and also the break type relay contacts that are made open in responsive to the operation of the corresponding output detecting relays are provided between the second switching contacts of the corresponding individual power source switch and the drive stop signal input terminals of the corresponding switching power source unit, and it is accordingly possible to stop only the operation of the switching power source the individual power switch or which is switched to the second switching contact. This is, for example, it is possible to replace only a switching power source unit at fault even during the operation of the system, because it is possible to stop separately the switching power source unit, and it is effective on maintenance for the switching power source circuit especially in a redundancy configuration.

What is claimed is:

1. A switching power source circuit comprising:
a plurality of switching power source units each having input sides connected in parallel to an input power source for receiving power supply, and actuated only under an AND condition of input of a start-up signal to all start-up signal input terminals thereof and stoppage of a drive stop signal to all drive stop signal input terminals thereof;
a common signal supply source for supplying said start-up signal and said drive stop signal to said switching power source units in a common logic level;
individual power source switches each provided for said switching power source units for switching selectively and alternatively between supply of said start-up signal to said start-up signal input terminals of corresponding switching power source units from said common signal supply source and supply of said drive stop signal to said drive stop signal input terminals of said corresponding switching power source units from said common signal supply source; and,
connecting line means for mutually connecting said drive stop signal input terminals of said switching power source units.

2. A switching power source circuit comprising:
a plurality of switching power source units each having input sides connected in parallel to an input power source for receiving power supply, and actuated only under an AND condition of input of a start-up signal to all start-up signal input terminals thereof and stoppage of a drive stop signal to all drive stop signal input terminals thereof; and
individual power source switches each provided for said switching power source units, common contacts of which are connected to a negative side of said input power source, first switching contacts of which are connected to said start-up signal input terminals of corresponding switching power source units, and second switching contacts of which are connected to said drive stop signal input terminals of all of said switching power source units.

3. A switching power source circuit comprising:
a plurality of switching power source units each having input sides connected in parallel to an input power source for receiving power supply, and actuated only under and AND condition of input of a start-up signal to all start-up signal input terminals thereof and stoppage of a drive stop signal to all drive stop signal input terminals thereof;

individual power source switches each provided for said switching power source units, common contacts of which are connected to a negative side of said input power source, first switching contacts of which are connected to said start-up signal input terminals of corresponding switching power source units, and second switching contacts of which are connected to said drive stop signal input terminals of all of said switching power source units;

output detecting relays each provided between output terminals of said switching power source units; and, break type relay contacts each provided between second switching and drive stop signal input terminals of source switches and drive stop signal input terminals of corresponding switching power source units and becoming open when corresponding output detecting relays detect output of said power source units.

* * * * *